United States Patent
Willette

[15] 3,693,894
[45] Sept. 26, 1972

[54] TIRE SHREDDER
[72] Inventor: Raymond W. Willette, 923 Dodd Road, St. Paul, Minn. 55118
[22] Filed: Nov. 30, 1970
[21] Appl. No.: 93,558

[52] U.S. Cl. ............................................. 241/279
[51] Int. Cl. .......................................... B02c 18/06
[58] Field of Search ....... 241/279, 280, 95; 51/106 R; 157/13; 18/2 J

[56] References Cited

UNITED STATES PATENTS

| 2,864,444 | 12/1958 | Glodde | 157/13 |
| 2,333,599 | 11/1943 | Terry | 51/106 R |
| 2,961,039 | 11/1960 | Glaze | 157/13 |
| 2,524,489 | 10/1950 | Strong | 157/13 |
| 2,087,304 | 7/1937 | Sawyer | 157/13 X |

Primary Examiner—Robert L. Spruill
Attorney—James R. Cwayna

[57] ABSTRACT

A device directed to shredding rubber tires and the like including a tire holding member for gripping the interior bead of various sized tires with means for rotating said member, a rotating cutting member for engaging the exterior of the tires and cutting the same into relatively small particles and means for transporting the particles from the cutting member. The unit includes means for properly feeding the tires into the cutting member with means for properly positioning the cutter member for proper cutting of the tire such that various sized tires may be shreded including the sidewalls thereof.

4 Claims, 6 Drawing Figures

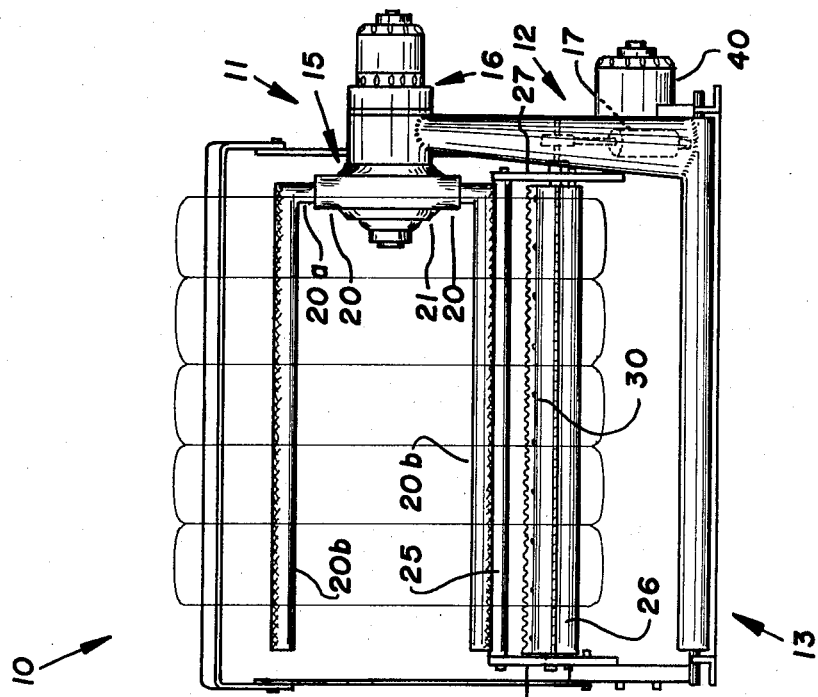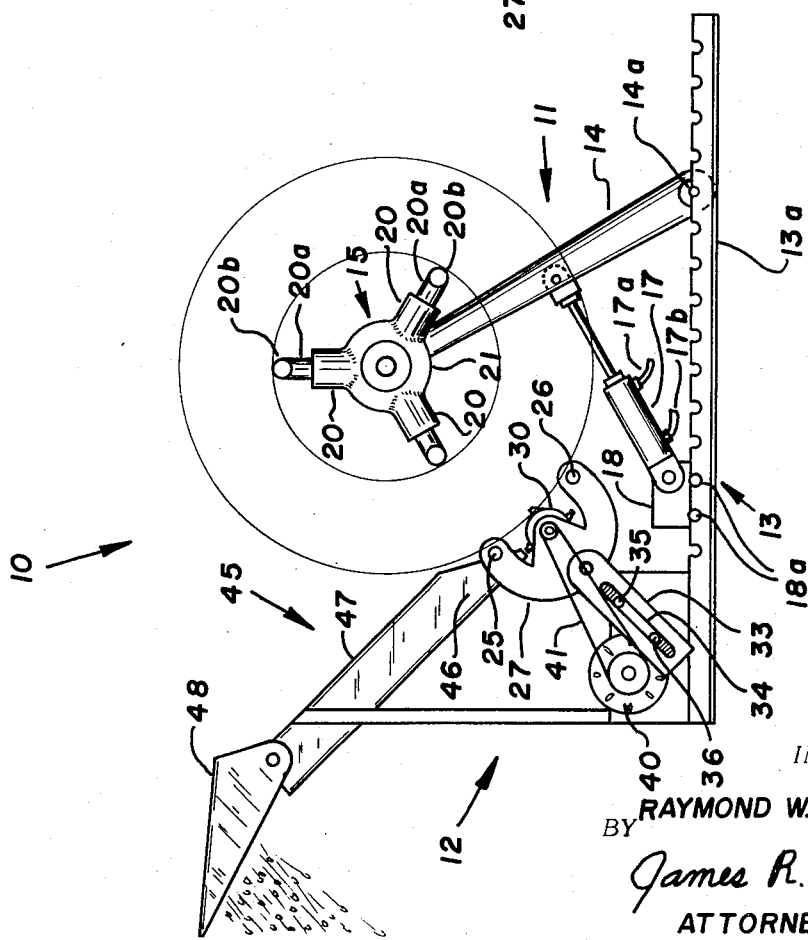

PATENTED SEP 26 1972 3,693,894
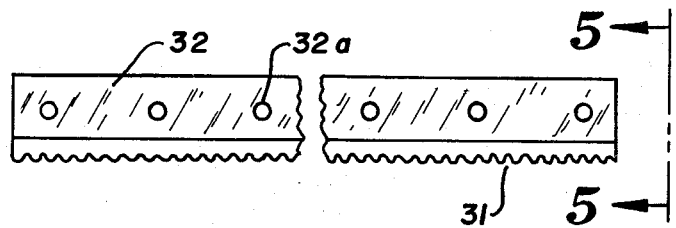
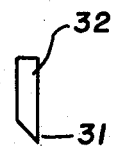
FIG. 4              FIG. 5
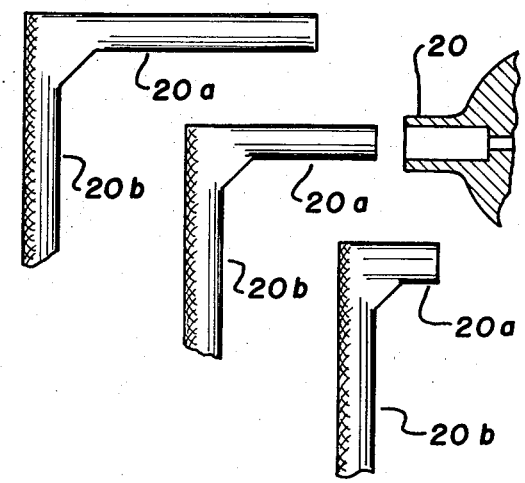
FIG. 6
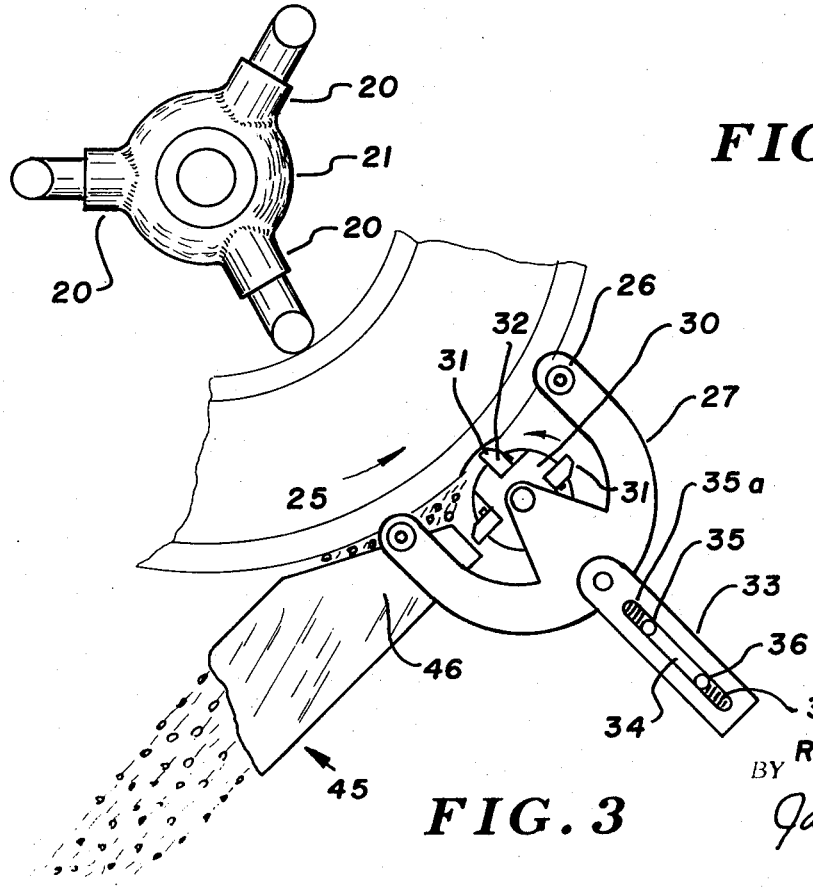
FIG. 3
INVENTOR.
RAYMOND W. WILLETTE
BY James R. Cwayna
ATTORNEY

TIRE SHREDDER

With the present concern about pollution, the destruction of automobile, truck tires and the like presents a very difficult problem.

Burning of the tires is banned in many areas due to the air pollutants resulting therefrom and even if the pollutants were absent, the resultant odor is particularly distasteful.

A complete tire cannot be used properly for landfill as the cavity provided by the tire is normally unfilled and when pilings are driven, as is usually necessary on filled land, the pilings are difficult if not impossible to drive through this resilient cavity. This cavity will remain as the tire is made of a material that will not rot under such fill conditions but rather requires some effect from heat and even then the time for such degradation is considerable.

The problem that applicant solves with the invention disclosed herein is not only directed toward this particular destruction problem as some present solutions exist for recovery of certain portion of such tires but also includes a product reclaimed from the tire which is capable of other applications and if not so used then is easily disposed of.

It is therefore an object of applicant's invention to provide a device to permit the destruction of auto, truck or similar rubber tires.

It is a further object of applicant's invention to provide a tire destruction device that will shred the tires into relatively small particles.

It is a further object of applicant's invention to provide a tire shredding device including means for mounting a rotating a tire against a rotating cutting member to substantially shred the tire into relatively small particles.

It is still a further object of applicant's invention to provide a tire shredding device which includes a tire mounting member having means thereon to move the tire into and against a cutting member and which will control the movement of the tire into the cutting tool such that the entire tire may be shredded including the sidewall thereof.

It is still a further object of applicant's invention to provide a tire shredding device having a tire mounting portion and a tire cutting portion having automatic control means to accommodate tires of various sizes such that the shifting of the elements with respect to one another will permit the entire shredding of the tire.

These and other objects and advantages of the invention will more fully appear from the following description made in connection with the accompanying drawings, wherein like reference characters refer to the same or similar parts throughout the accompanying views, and in which;

FIG. 1 is an elevation of a tire shredding device embodying the concepts of applicant's invention;

FIG. 2 is an end view taken of the device as illustrated in FIG. 1;

FIG. 3 is a portion of FIG. 2 being drawn to an enlarged scale;

FIG. 4 is a plan view of one of the cutting elements employed in the cutting portion of the device;

FIG. 5 is an end view taken of the cutting element illustrated in FIG. 4; and,

FIG. 6 illustrates a means for accomodating various tires on the device depending upon the internal or bead diameter thereof.

In accordance with the accompanying drawings, the tire shredding device embodying the concepts of applicant's invention is generally designated 10 and includes a tire mounting and rotating section 11 and a tire cutting and shredding section 12 with a common frame or base element 13 for mounting the two sections in compatible and operative position with respect to one another.

As illustrated in FIG. 1, the device 10 is designed to accomodate a plurality of tires in side-by-side position across the width thereof and it should be understood that this width may be expanded or contracted to accomodate an economically sufficient number of tires without departing from the scope of the invention.

The common frame or base member 13 obviously must provide sufficient length and width to accomodate the demand placed upon the unit by vibrations and the like and in operation would normally be mounted upon a substantially solid floor but would include at least one extending member 13a having a plurality of locating notches or the like for positioning the tire mounting and rotating section 11 thereon in a plurality of positions to maintain the tires in proper relation to the cutting section 13 which is fixedly attached to the opposite end of the base 13.

The tire mounting and rotating section includes a first upstanding arm member 14 having one end thereof provided with notch engaging means 14a to be releasably received into the locating member 13a and the other end thereof provided with a tire mounting means 15 which includes an integrally arranged tire rotating means 16 taking, in the form shown, the form of an electric or hydraulic motor. Obviously this same type of driving rotation for the mounting member 15 could be obtained by a belt or chain system but the form shown offers a compact and totally independent and therefore movable system. In order to control the lowering or raising of the arm 14 about its locating point 14a, a cylinder 17 is pivotally mounted to a midpoint of arm 14 and likewise pivotally mounted to a positionable mounting member 18 which member 18 is again provided with notch engaging members 18a to permit adjustment thereof along the base member 13a.

Control of the lowering and raising of the arm 14 and thus the tire mounting member 15 is obtained by control of the cylinder through the introduction and release of, if the cylinder be hydraulic, hydraulic fluid to and from the fluid lines 17a, 17b. This control may be maintained to permit controlled lowering of the mounted tires into the cutting section 13 at a predetermined rate such that they will not collapse which could be the case if the weight of the tires were the only factor considered. This control is also essential to hold the mounting device 15 in a proper upright, loading position.

The tire mounting member 15 may, as in the form shown, include a tri-armed hydraulic ram device which would include three equally spaced hydraulic rams 20 arranged in a common member 21 which common member would be rotatably driven by the driving member 16 which driving member is mounted on the upper end of arm 14. The individual ram assemblies 20 would each include piston member 20a each of which would be repaceable to permit a plurality of tires to be affixed to an extending arm 20b thereof without requiring that the ram assembly have a different or be capable of a different stroke for each size tire. Obviously a hydraulic construction utilizing such an interchangeable piston situation is not new and those skilled in the art would realize that the drawing of FIG. 6 is only suggestive of various lengths of pistons that may be required to accomplish such a varied mounting task and that no attention has been paid to the necessary sealing rings and the like that would be employed to accomplish the proper sealing of the pistons 20a to the assemblies 20.

Again, although a device is illustrated to accomodate a particular number of tires for shredding, it should be obvious that, if a large number of tires are shredded at one time that supports may be necessary on the outboard ends of the arms 20b of the pistons 20a.

The cutting section 12 includes a first pair of tire contacting roller members 25, 26 mounted on a common member 27 and spaced a predetermined distance apart thereon. These roller members 25, 26 are designed to contact the exterior of the tire and allow the cutting tool 30 to cut therein only to a predetermined depth. Obviously these rollers extend the entire transverse width of the device and a pair of spaced plates 27 must be provided on the respective sides of the device for their proper support.

Mounted between and on the same plates 27 as the rollers 25, 26 is the cutting tool 30. This member 30 as well as the rollers are mounted for rotation in the plates 27 and it should be noted that the cutting edges 31 of the individual cutting blades 32 extends past the rollers a predetermined amount such that the depth of cut is controlled and this obviously controls the shred size. In the form shown, the individual blades are inset into the cutting tool and one such blade 32 is illustrated in FIGS. 4 and 5. The blade 32 is provided with a plurality of mounting apertures 32a therethrough for mounting the same to the tool and a plurality of teeth 31 are provided. It should be noted that as illustrated in FIG. 4 the teeth 31 are spaced longitudinally along the blade portion 32. When mounting the same blades 32 on the cutting tool 30 it should be pointed out that these teeth should not be in alignment with one another as the tool rotates for if they were in such alignment a plurality of grooves would be formed. By shifting the blades on the tool member 30 the teeth will not be in this alignment and pieces of the tire will be cut.

If the teeth on following blades were aligned then there would be a stripping rather than a piece cutting of the tire material.

In order to provide and maintain proper alignment of the cutting tool 30 and the associated rollers 25, 26 with the various sized tires, the plates 27 are pivotally mounted on mounting bars 33 which bars are further provided with a slot 34 for positioning the same to a base member having extending locating pins 35–36. Compensating spring members 35a–36a are provided such that a certain amount of oscillatory movement is provided for the bars 33 to take up loading shock and the like and also to maintain the cutter in "riding" relation to the tire being cut by the tool 30.

In order to provide rotative power to the cutting tool 30 a motor is provided with a limited flexing drive connection to one end of the cutting tool. The motor being designated 40 and the connection 41. The only reason for the limited flexibility is for the limited oscillation of the unit through the aforementioned slotted connection.

This cutting section provides a self aligned construction such that the cutting tool 30 may be kept in constant cutting relation to the tire being rotated therepast.

It should be obvious that for proper cutting of the tire that the rotation of the tire must be in counter-relation with respect to the rotation of the cutting tool. In the form shown in FIG. 3, the rotation of the tire and tool is counter clockwise which will provide surfaces which are properly acting against each other to give the proper cutting action.

Although not illustrated, in certain situations and particularly dependent upon the speed of rotation, it may be necessary to provide a spray onto and into the cutting area such that the created friction will not overheat the cutting blade nor overheat the material being cut.

In order to transport the cut pieces from the cutting area, applicant provides a delivery chute extending from the cutting area adjacent the cutting tool 30 and extending upwardly therefrom to a remote discharge and collection area. The cute 45, in the form shown includes a transversely extending receiving section 46, a transport section 47 and a directional discharge member 48. This entire chute system may include an air assist device to aid in drawing the chips from the cutting area.

With the device illustrated it is possible to control the rate of descent of the tire to be shred and the speed of rotation thereof as well as the speed at which the cutting tool is rotated. This combination of controls will permit several advantages over any stripping or destruction devices presently or previously in use. Proper feeding will allow proper cutting size and will permit the entire tire to be destroyed if so desired considering of course the fact that certain tire beads are metalic and this portion of the tire could not be so destroyed by this shredding process. By properly feeding the tire into the device it is possible to maintain the sidewalls in a non-collapsed condition and therefore allow them to be shredded.

With the now shredded material proper disposal is available and other uses for the shredded material other than simply disposal is also available. With the shredded material in an appropriate size it may be used as a filler for certain construction materials such a macadam and the like which materials do require a filler.

It should be obvious that applicant has provided a new and unique tire shredding device that will permit complete destruction of the tire again assuming that there is no metallic bead on the tire if so desired and which will allow the same to be done economically by providing a device that is capable of working on a plurality of tires at the same time providing only that the tires are of the same internal or bead diameter but which unit is also easily adaptable to tires of various sizes by providing adjustability of selected portions thereof.

What I claim is:

1. A tire shredding device including:
   a. a frame member;
   b. a tire mounting member mounted on said frame including a plurality of arm members arranged to engage the internal diameter or bead of the tire;

c. a head member carrying said arm member and permitting radial extension thereof;
d. means for controlling and radially shifting said arm members;
e. means for rotatively driving said tire mounting member;
f. a tire cutting tool mounted on said frame;
g. means for rotatively driving said cutting tool; and,
h. means for moving said tire mounting member and tires mounted thereon into cutting engagement with said tool.

2. The structure set forth in claim 1 and said cutting tool including:
a. a tool holding bar;
b. a plurality of cutting blades carried by said tool holding bar;
c. means for controlling the cutting depth of said blades including,
1. a frame member;
2. a pair of roller members mounted on said frame member engaging the exterior of the tire to be shredded; and,
3. said tool holder being mounted intermediate said roller members.

3. The structure set forth in claim 2 and said frame member mounting said rollers and cutting tool being pivotally mounted on a portion of said mounting frame whereby said cutting tool is self aligning with respect to the tire being moved thereagainst.

4. The structure set forth in claim 1 and said arm members including sets of arm members of predetermined lengths to permit the adaption of the shredder to tires of various sizes.

* * * * *